United States Patent [19]

Chan et al.

[11] Patent Number: 5,127,051
[45] Date of Patent: Jun. 30, 1992

[54] ADAPTIVE MODEM FOR VARYING COMMUNICATION CHANNEL

[75] Inventors: C. Chiu Chan, Cedar Grove, N.J.; Marvin A. Epstein, Monsey, N.Y.; Paul A. Gilmour, Bloomfield, N.J.

[73] Assignee: ITT Corporation, New York, N.Y.

[21] Appl. No.: 206,155

[22] Filed: Jun. 13, 1988

[51] Int. Cl.⁵ .................................. H04M 11/00
[52] U.S. Cl. .................................. 380/49; 375/8; 375/13; 375/14; 379/93; 455/65
[58] Field of Search .................. 375/7–16, 375/1; 379/398, 93; 333/18, 28 R; 455/67; 380/49, 50, 34

[56] References Cited

U.S. PATENT DOCUMENTS

| | | | |
|---|---|---|---|
| 3,596,182 | 7/1971 | Menard | 375/10 |
| 3,696,203 | 10/1972 | Leonard | 333/18 X |
| 3,864,632 | 2/1975 | Chang | 333/18 X |
| 4,058,713 | 11/1977 | DiToro | 333/28 R X |
| 4,264,959 | 4/1981 | Blaäss | 455/67 X |
| 4,330,764 | 5/1982 | Miedema | 333/18 |
| 4,389,623 | 6/1983 | Onishi et al. | 375/14 X |
| 4,394,768 | 7/1983 | Sari | 333/18 X |
| 4,408,332 | 10/1983 | Sari | 333/18 X |
| 4,519,084 | 5/1985 | Langseth | 333/18 X |
| 4,528,676 | 7/1985 | Mein et al. | 375/14 |
| 4,577,328 | 3/1986 | Senoo | 375/13 |
| 4,672,630 | 6/1987 | Kaku | 375/13 |
| 4,674,103 | 6/1987 | Chevillat et al. | 375/13 |
| 4,709,374 | 11/1987 | Farrow | 375/13 |
| 4,756,007 | 7/1988 | Qureshi et al. | 375/8 X |
| 4,780,883 | 10/1988 | O'Connor et al. | 375/7 |

*Primary Examiner*—Bernarr E. Gregory
*Attorney, Agent, or Firm*—Arthur L. Plevy; Patrick M. Hogan

[57] ABSTRACT

An improved modem system for HF data transmission over a varying communication channel transmits data in packets formatted into successive frames, each having two identical training sequences following a sequence of data. Each training sequence has a time length longer than the expected time length of the multipath dispersion in the communication channel, in order to isolate one training sequence in each frame from multipath interference from the preceding data sequence. The "clean" training sequence allows the receiving modem system to derive very accurate channel estimates for each frame by autocorrelation to the known symbol sequence stored at the receiver. By interpolating across the channel estimates for the current and previous frames, the modem system can track the communication channel by interpolated estimates for any part or any point in time of the data sequence. An improved data recovery algorithm divides the received data sequence in each frame into a series of data blocks, each of which is processed through a respective decision loop using the interpolated channel estimates corresponding to the time position of the data block in the data sequence. The interpolated channel estimate for each data block is used to set the tap values for the filter functions of the corresponding decision loop.

22 Claims, 7 Drawing Sheets

FIG. 6

| SOURCE SEQUENCE ⊗<br>(SHIFT + ROTATE) | | SUM AT CORRELATION INTERVAL<br>(PATH A) | | (PATH B) | =MP |
|---|---|---|---|---|---|
| $pt_0\|pt_1\|pt_2\|pt_3$ | ⊗ 2x | $pt_0\|pt_1\|pt_2\|pt_3$ | + 1x | $pt_1\|pt_2\|pt_3\|pt_0$ | =8 |
| $pt_3\|pt_0\|pt_1\|pt_2$ | ⊗ 2x | $pt_0\|pt_1\|pt_2\|pt_3$ | + 1x | $pt_1\|pt_2\|pt_3\|pt_0$ | =0 |
| $pt_2\|pt_3\|pt_0\|pt_1$ | ⊗ 2x | $pt_0\|pt_1\|pt_2\|pt_3$ | + 1x | $pt_1\|pt_2\|pt_3\|pt_0$ | =0 |
| $pt_1\|pt_2\|pt_3\|pt_0$ | ⊗ 2x | $pt_0\|pt_1\|pt_2\|pt_3$ | + 1x | $pt_1\|pt_2\|pt_3\|pt_0$ | =4 |

TIME →

WHERE $R(k \otimes m) = 4$ FOR $k=m$
$R(k \otimes m) = 0$ FOR $k \neq m$

ADAPTIVE MODEM FOR VARYING COMMUNICATION CHANNEL

FIELD OF INVENTION

This invention was made under a government contract F30602-83-C-0195 NBHF.

This invention relates to a modem which adapts to a varying communication channel by accurate and ongoing estimation of the channel response in order to decode data signals transmitted over the channel with a high degree of accuracy. In particular, the invention is directed to an adaptive modem for receiving a high frequency transmission in the form of packets made up of alternate sequences of known training symbols and unknown data symbols. The invention uses the known training sequences to estimate the channel response at the instant of the training sequence. The invention then uses the estimated channel response to interpolate the channel response across the unknown data sequence, and divides that data sequence into data blocks for decision processing using interpolated channel estimates.

BACKGROUND OF INVENTION

When data signals are transmitted over a communication path, various types of distortion and noise are introduced. This is due to interference and the changing and dispersive nature of the communication path. A principal form of distortion is the multipath dispersion which occurs when signals propagate along different or reflected paths through a transmission medium to the receiving destination. For example, in high frequency (2 to 30 MHz) transmissions which are bounced off the ionosphere, multipath dispersion is introduced in the transmission in the form of echoes, time delays, fading, phase changes, and other adverse influences of the communication channel. Accordingly, the signals received are not the same as the original message, and when they are demodulated and decoded there are often errors in the output data. Other adverse effects include interference between the transmitted data symbols (intersymbol interference or ISI), and noise which reduces the signal to noise ratio (SNR) at the receiving end.

Various approaches have been developed to compensate for the adverse effects of the communication channel on data transmissions. One approach, such as disclosed in U.S. Pat. No. 4,058,713 to Di Toro, has been to transmit alternating bursts of a known test signal with segments of the original (unknown) data, and to use the known test signal at the receiver to derive an estimate of the channel influence, which estimate is then employed to process the unknown segments of data using a frequency domain data recovery algorithm. With this type of approach, a delay factor is introduced in the format of the transmitted message, which limits the data rate, and detection errors occur if the channel varies significantly at a rate shorter than the period of the data segment. Another method uses channel response estimates to set the coefficients of adaptive equalizers or recursive filters in a time domain data recovery algorithm. A well known technique called "Adaptive Decision Feedback Equalization" (ADFE) has been developed by Bell Laboratory, as described in "Optimum Mean-Square Decision Feedback Equalization", by J. Salz, BTSJ 52, pp. 1341-1373 (1973), and "A Unified Theory of Data-Aided Equalization", by M. S. Mueller and J. Salz, BTSJ 60, pp. 2023-2039 (1981). The performance obtained by the ADFE technique depends very much on the method used to estimate the channel response, because as the channel response changes, the DFE coefficients must be adapted to compensate for the new channel response. In a slowly varying channel, where the fade rate is much less than 1 Hz, e.g. 0.2 Hz, a simple channel tracking algorithm is usually adequate. The adaptation is usually performed within several update cycles in a time period shorter than the fade rate. However, in a more rapidly fading channel, i.e. with fade rates near 1 Hz and above, the update cycles needed to converge on a new channel response often exceed the fade period, and the updated channel response may be outdated before it can be used. The failure to appropriately track the channel response leads to poor performance of the ADFE technique in a fast fading environment. Also, the requirements for digital data transmissions are more stringent for higher data rates of 1200, 2400, 4800 bps or more. Such data rates require more accurate compensation for dynamic channel variations in the range of 1 Hz or higher for high frequency (HF) transmissions.

A faster channel tracking method requires speeding up the update cycles, typically by using a faster microprocessor or by using an improved updating algorithm which requires less computation. As an example of the former approach, reference is made to U.S. Pat. No. 4,365,338 to McRae et al. This patent discloses the transmission of data in packets made up of successive frames, each having a sequence of N known symbols followed by M unknown data symbols. An estimate of the channel response is updated at the receiving end for each frame. A channel tracking algorithm derives an estimate of the channel response by cross correlating an N+M vector of received symbols with the 2N known symbols of the current and previous frames and the channel estimate for the previous frame. The channel estimates are in the form of N+1 weighting coefficients of a transversal filter function applied to the received symbols. The M unknown symbols in each frame are decoded by a "Data Directed Equalization" (DDE) algorithm which calculates the expected error in the decoding decisions on the unknown symbols, and reiterates the error calculation using refined decoding decisions until final decisions on the M unknown symbols are reached having an acceptably low error factor. However, this type of system has the disadvantage that a heavy load of computation is needed to process and decode the data, requiring a specially designed fast array processor, and only achieves acceptable accuracy by extensive iterative recalculation. A major problem with this approach is the inclusion of the unknown symbols in the cross correlation to solve for the channel estimates. The method estimates the channel response based upon unknown inputs from the transmitter and is limited in accuracy and response time as it requires several frames of data to be iteratively processed before the channel estimates converge on true values.

For some applications, such as defense communications, the requirements for transmission and recovery of data are even more stringent. For example, the length of the transmitted data packet may be shortened or changed, and the transmissions may hop in stepped sequence over different frequencies in order to deter interception. Frequency hopping poses severe requirements on channel tracking, since the multipath dispersion is constantly changing over time and is different from one channel to another. For higher data transmission rates, the heavy computational load of the above-mentioned McRae type of system increases its cost and complexity, deteriorates its real time response, and requires trade-offs in the bit-error rate. The computational load can be lowered using an improved data recovery algorithm, for example, as disclosed in U.S. patent application Ser. No. 694,549 filed Jan. 24, 1985, now U.S. Pat. No. 4,761,796 and entitled "High Frequency Spread Spectrum Communication System Terminal", by J. G. Dunn et al. The Dunn system employs an optimal polyphase code (known symbol) sequence at the beginning of each data packet. The code sequence is matched to the anticipated HF channel characteristics in that it employs two repetitions of the polyphase code, with each repetition being greater in length than the multipath delay. Therefore the second repetition of the code does not have any interference from delayed versions of any preceding unknown data symbols. The modem uses the channel estimates derived from processing the received code sequence to set the tap values for linear canceller, feedback equalizer and matched filter functions in a decoding decision loop. The decision loop provides a non-iterative form of equalization to compensate for the multipath effects of the HF channel. The received unknown data is passed twice (or more) through the decision loop to obtain more accurate symbol decisions on the second pass using the preliminary symbol decisions obtained on the first pass. However, the Dunn system has difficulty tracking the channel at channel fade rates above 1 Hz. This is because the channel response is changing rapidly at these higher fade rates: the channel response is well known for the portion or the unknown data symbols immediately following the training symbols, allowing these data symbols to be demodulated with few bit errors: the channel response typically changes significantly by the end of the packet, resulting in many bit errors when the final data symbols are demodulated.

An extension to the Dunn system (one known sequence and one data sequence per packet) would be to break the packet into shorter frames, and to alternate the known and unknown symbol sequences in each frame so that the framing data would always be located closer to the unknown data, allowing the channel response to be better known during the unknown data. Unfortunately this increases the overhead due to the large amount of training data, so that the available data rate is unacceptably limited.

Another extension to the Dunn system would be to break the packet into shorter frames, and include a header frame using Dunn's training format (2 repetitions of a polyphase code, with each repetition exceeding the multipath delay) and then in the subsequent data frames include known data equal to the multipath delay, ala McRae. This allows a fast and accurate initial channel estimate with subsequent updating to track the changing channel. Unfortunately if low-computational cost (conventional least mean square) updating techniques are used, then this approach can get "lost" midway through the packet if one of the frames fades deeply resulting in many bit errors. Since unknown data is included in the updates of the channel estimate, it is not possible for the tracking mechanism to recover unless expensive computational approaches (ala McRae) are used.

SUMMARY OF INVENTION

In view of the above problems and disadvantages of conventional modem systems, a modem system is needed which can provide less computationally intensive data recovery, and can adapt to channel variations higher than 1 Hz, by rapidly deriving accurate channel estimates without excessive training data overhead.

Therefore, it is an object of the present invention to provide a modem system which can adapt to multipath dispersion in a communication channel and to channel variations at high fade rates of 2 Hz or more. It is also desired that the modem system be adapted for data transmissions at higher data rates of 4800 bps or more (i.e. have low training overhead), and provide accurate decoding of the received data signals with very low bit-error rates.

It is a further object of the invention to provide a packet format and channel tracking algorithm which allow accurate channel estimates to be derived quickly from frame to frame, as well as within each frame of data, without heavy computational processing.

Still a further object of the invention is to provide an improved data recovery algorithm which is not computationally intensive and which decodes the data with very low bit error rates, and where the energy/bit to noise ratio may be low and the transmissions may hop from one frequency to another with each transmitted data packet.

In accordance with the invention, a transmitted data packet is formatted into successive frames. The initial frame carries two identical training sequences. Each succeeding frame is comprised of two identical training sequences, one after another, following a sequence of data. Each training sequence is made up of M known symbols and has a time length longer than the expected time length of the multipath dispersion in the communication channel. Therefore, the second training sequence of each current frame is isolated from any multipath interference from the preceding unknown data sequence, and a "clean" received signal of the training sequence is obtained for each frame. The "clean" received training sequence enables the receiving modem system to derive very accurate channel estimates for each frame by autocorrelation to the known symbol sequence stored at the receiver. By interpolating across the channel estimates for the current and previous frames, the modem system can track the communication channel by interpolated estimates of the data sequence. Interpolation reduces the amount of training data required to get accurate channel estimates; i.e. interpolation reduces training overhead.

The invention further encompasses an improved data recovery algorithm which divides the received data sequence in each frame into a series of two or more data blocks. Each data block is processed through a respective decision loop using interpolated channel estimates corresponding to the time position of the data block in the data sequence. The interpolated channel estimate for each data block is used to set the tap values for the filter functions of the corresponding decision loop. Each decision loop includes: a precanceller filter function which precancels the expected ISI influence of the following symbols; a matched filter function to combine the signals dispersed by the multipath channel into a reinforced signal having a higher SNR; a feedforward filter function to remove the ISI influence of the following symbols; and a feedback filter function to remove the ISI influence of the preceding symbols introduced as a result of passing the received signals through the matched filter. Each data block is passed through its corresponding decision loop on two or more passes. The unknown symbols for each data block are preliminarily decided in the first pass through the corresponding decision loop. On the second (or subsequent) pass, the first (or prior) pass decisions for each preceding data block are used in the feedback filter function for the following data block, and the decisions for each following data block are used in the precanceller filter function for the preceding data block. The decisions for each data block are thus improved with each additional pass as the prior decisions for the preceding and/or following data blocks are employed in the precanceller or feedback filter functions for the current pass.

The present invention provides at least the following advantages. An accurate channel estimate is obtained for each frame based upon a received known symbol training sequence which does not include any multipath interference from unknown data symbols. The modem system can adapt frame by frame to rapidly varying channel characteristics and thereby avoid the loss of data even when the channel is changed by frequency hopping with each transmitted packet. The channel estimates are calculated only once for each frame without intensive computation, thereby reducing the computational load. Intermediate channel estimates for serial parts (blocks) of the data sequence in each frame are interpolated between channel estimates for adjacent frames. Also, the data sequence is divided into two or more blocks for processing through respective decision loops using the interpolated channel estimates. These interpolated estimates directly correspond to the time positions of the data blocks in the data sequence. By using these interpolated estimates, the performance of the corresponding decision loops are enhanced, thereby allowing more accurate data decisions to be obtained, but no additional overhead cost for training symbols is incurred. Moreover, the decisions on the unknown symbols of each data block are improved on the second or subsequent pass through the respective decision loops, by using the previous pass decisions to improve filtering for ISI influences in the current pass. As a result, an adaptive communication modem is provided capable of adapting to channel fade rates of 2 Hz or higher, operating at data rates of 4800 bps or higher, and obtaining very low bit-error rates even at low energy/bit to noise ratios.

BRIEF DESCRIPTION OF FIGURES

The above objects and advantages and further features of the invention are described in detail below in conjunction with the drawings, of which:

FIG. 6 illustrates use of the autocorrelation function of a known source sequence applied to the received training sequence to obtain an estimate of the channel impulse response of FIG. 5;

DESCRIPTION OF PREFERRED EMBODIMENTS

Generally, the invention is directed to a modem system for the transmission and accurate recovery of data through a communication channel which undergoes multipath dispersion and other dynamic variations. The modem system adapts quickly to the varying channel by deriving frequent estimates of the channel response across the transmitted data. Data is transmitted in a packet having a series of frames in which a sequence of unknown data symbols is alternated with a sequence of training symbols. The sequence of training symbols is used to derive an estimate of the instantaneous channel response at the time position of the training symbols in each frame, then the instantaneous channel responses are interpolated between the estimates for adjacent frames and used for adaptive filtering of the data sequence in order to accurately decode them. The interpolated channel estimates correspond to the time positions of the data being decoded and therefore allow more accurate compensation for the varying channel.

For the preferred embodiments of the invention described below, the modem system is adapted for high frequency (2 to 30 MHz) digital data transmissions through the atmosphere by bouncing from the ionosphere, for data sent in packets at relatively high data rates or 1200, 2400, 4800 bps or higher. However, it is to be understood that the principles of the invention may also be applied for other types of transmission rates, to other kinds of communication channels, such as mobile radios, underwater acoustics, troposcatter, satellite, meteor burst, passive reflection (blimp) as well as other frequency ranges of radio signals (VHF, UHF, microwave, etc.).

Figure 1:
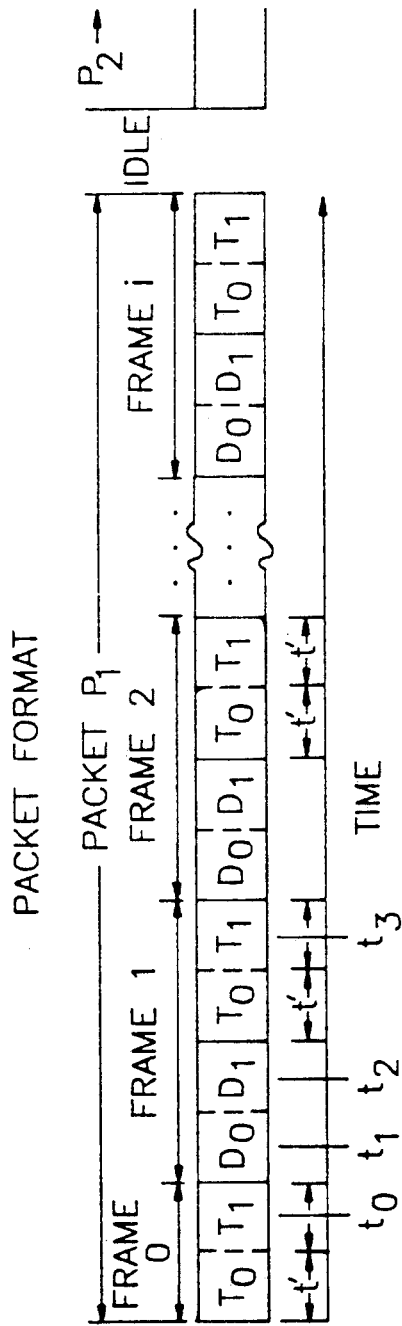
FIG. 1 is a schematic drawing of an improved packet format for a modem system in accordance with the invention.

Referring to FIG. 1, a packet format in accordance with the invention consists of alternating sequences of known training symbols and unknown data symbols grouped into successive frames. A series of frames are grouped together in a packet. The packet can be of any chosen length depending on the application, transmission type, and communication channel used. For some applications, such as defense communications, the packets may vary in length and may be transmitted by spreading over a plurality of different frequencies and/or by hopping over a sequence of different frequencies in order to avoid interception In the preferred packet format, the training sequence has two adjacent training blocks $T_0$, $T_1$ each containing an identical sequence of M training symbols, as explained further below. The training blocks in the packet $P_1$, as shown in FIG. 1, form an initial Frame 0, and in each frame thereafter, they follow the sequence of unknown data symbols. The training blocks may also be formatted to precede the data sequence and end the packet with a final set of training blocks, as long as each data sequence is bounded on both sides by the training sequence. An idle interval separates the packet $P_1$ from the next packet $P_2$. The data sequence is divided into a selected number of data blocks, shown as two data blocks $D_0$, $D_1$, each containing N data symbols. The number of divided data blocks is selected to optimize the accurate processing of the received data signals, as will be explained.

Figure 2:
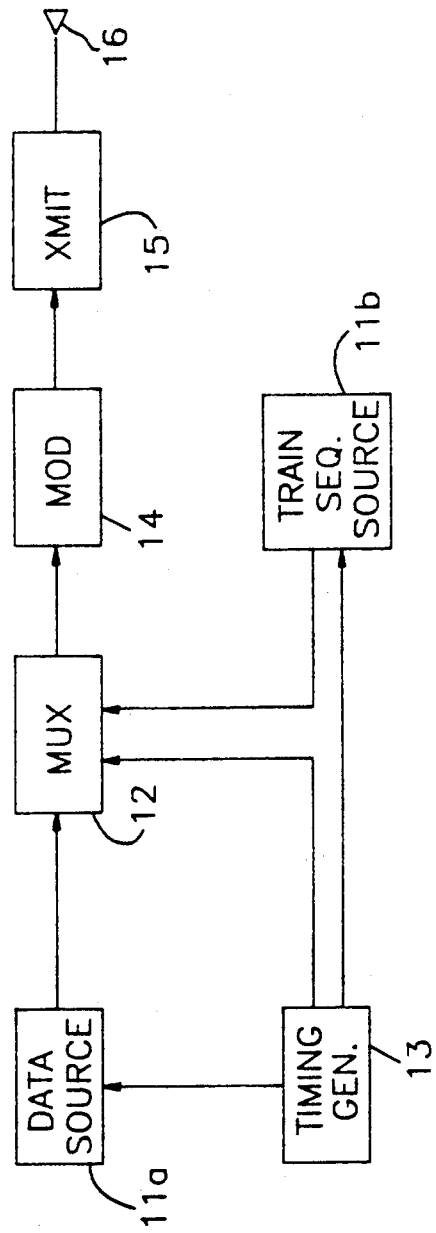
FIG. 2 is a schematic drawing of the transmitting side of the modem system of the invention.

As shown in FIG. 2, the modem system for carrying out the invention includes, on the transmitting side 10, a data source 11a providing sequences of data symbols for successive frames, a multiplexer (MUX) 12 which alternates each data sequence with the two training blocks $T_0$, $T_1$ having the same training symbol sequence provided by a training sequence source 11b, in accordance with timing control signals provided by a timing generator 13. The formatted packet of successive frames of unknown data and known training symbols are converted to wave signals by a modulator (MOD) 14 and transmitted by a transmitter unit (XMIT) 15 through a transmitting antenna 16. The formatting and multiplexing of data sequences into packets for HF transmissions is considered to be conventional and is not described further herein.

Figure 3:
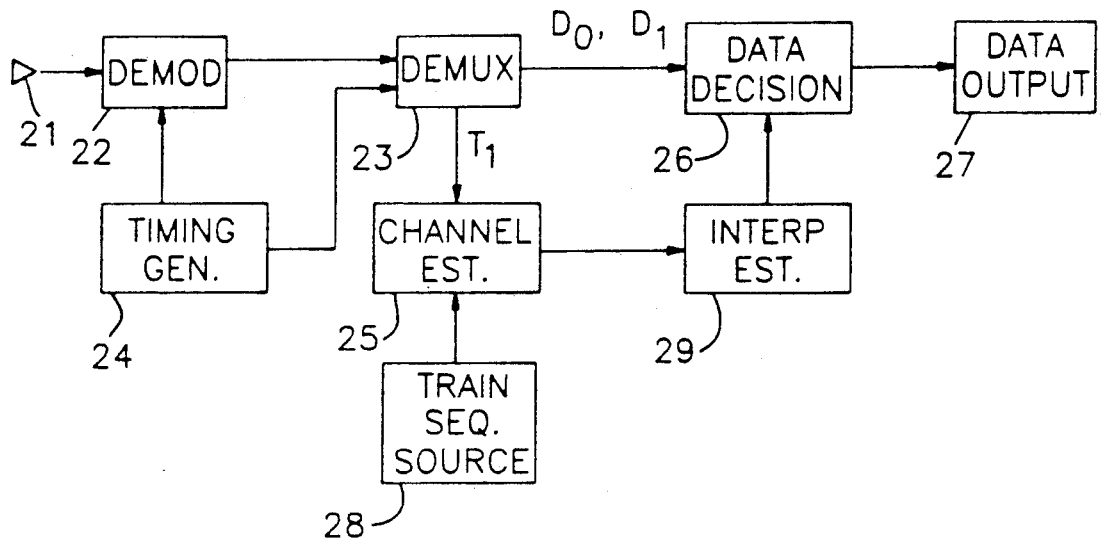
FIG. 3 is a schematic drawing of the receiving side of the modem system of the invention.

In FIG. 3, the receiving side 20 includes a receiving antenna 21 which receives the signals transmitted from the transmitter through the communication channel, a demodulator (DEMOD) 23 for demodulating the received signals and converting them into successive samples representing the received symbols, a demultiplexer (DEMUX) 23, controlled by timing signals from a timing generator 24, for providing the received symbols for the training block $T_1$ of each frame to a channel response estimate unit 25, and dividing the frame into respective data blocks $D_0$, $D_1$. The data blocks are provided to respective decision loops of a data decision unit 26. The demodulator 22 typically provides a plurality K of signal samples for each symbol, in order to adequately capture the signal information, and the subsequent processing is accordingly designed to accommodate the K samples of each symbol. However, for simplicity of notation, the description herein will assume $K = 1$. The demultiplexer 23 includes buffers for storing the signal samples for the frames of an entire received packet for frame-by-frame processing in the decision unit 26. For purposes of this description, the data sequence is taken as divided into two data blocks $D_0$, $D_1$. However, if a data sequence is relatively long, or if it is desired to obtain more frequent interpolated estimates and/or to process the data sequence in shorter block lengths, a greater number of data blocks may be used.

Based upon the received training sequence from the demultiplexer 23 and the known sequence provided from a sequence source unit 28, estimates for the channel response at each training period $T_1$ are obtained for each frame by the channel estimate unit 25. Interpolated channel estimates are calculated for each data block by an interpolation estimate unit 29, using the estimates for the training periods of adjacent frames. The decision unit 26 processes the data blocks frame-by-frame to decision output 27 through the respective decision loops using adaptive filtering functions, the values of which are set by the interpolated estimates of the channel response corresponding to the respective time positions of the data blocks, as will be described in further detail below. The demodulation and demultiplexing of successive frames and blocks of a packet is considered to be conventional and is not described further herein. A more complete description of the transmitting and receiving modem hardware for HF transmissions is provided in U.S. patent application Ser. No. 694,549 now U.S. Pat. No. 4,761,796 by Dunn et al. This application is incorporated herein by reference and was referenced above.

The channel estimate for the training period $T_1$ of each frame is obtained by performing an autocorrelation function of the received training symbols with the source sequence from the source unit 28. The source sequence in the modem receiver 20 is the same as the one used in the transmitter 10. It can be stored in the receiver modem in permanent form, such as in ROM, or adapted to be changed periodically in applications which require countermeasures against the interception of transmitted messages.

In accordance with a principle of the invention, two training blocks are used so as to interpose the first block $T_0$ having a time length longer than the multipath delay between the second block $T_1$ and the preceding data sequence. This is done in order to isolate the second block $T_1$ from multipath interference attributable to the unknown data symbols. In the preferred packet format shown in FIG. 1, both training blocks have a time length t' longer than the expected multipath delay, so that the two blocks together have a time length longer than twice the expected multipath delay. Use of the double-length training period reduces the computation required to make accurate estimates of the channel response. This is because the training block used to derive the channel response estimate has no multipath interference from the unknown data symbols. For HF ionospheric transmissions, the maximum expected delay in the channel from multipath dispersion is in a range of up to 5 milliseconds (ms.) so that time length t' is selected to be longer than about 5 ms. In a more general approach, the two training sequences in the double-length training period need not be identical. Rather they can be replaced by a single pseudo-random sequence that occupies the entire double-length training period. In this case, the computation required to make accurate estimates of the channel response would be more complicated.

The known symbols used in the training blocks are a polyphase code. The number of symbols chosen to make up the polyphase code depends upon the channel characteristics and the specific application in which it is used, and can vary from several symbols to several thousand symbols. The code's symbols are selected to produce an optimal autocorrelation response. A good polyphase code minimizes the effect of noise and interference on the channel measurement and produces a clear "hit" when correlated to its received version. For a more detailed discussion of optimization of the polyphase code, reference is made to the Dunn et al. application and to "Polyphase Codes With Good Periodic Correlation Properties", by D. C. Chu, IEEE Transactions on Information Theory, 531–532 (July 1972). For purposes of the present invention, it is assumed that a good polyphase code has been chosen and that it has a time length longer than the multipath dispersion delay.

Figure 4:
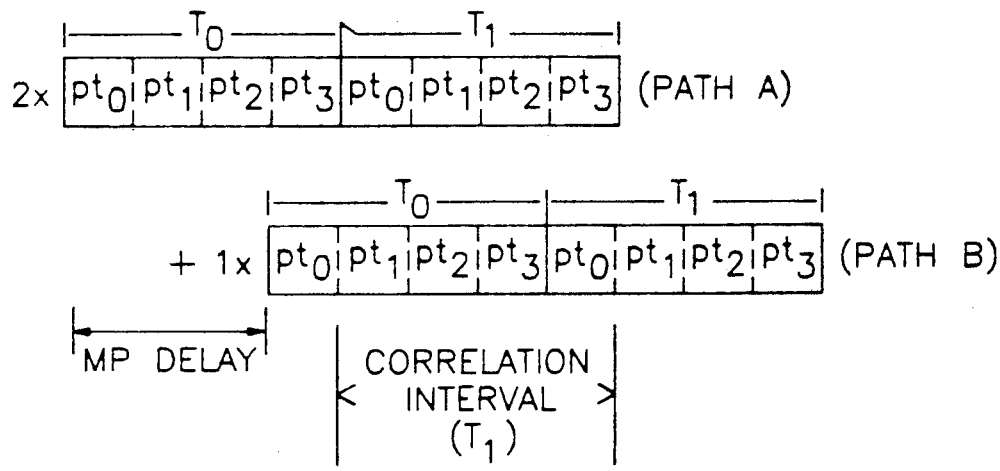
FIG. 4 illustrates an example of a training sequence in the packet format of the invention as subjected to multipath dispersion.
Figure 5:
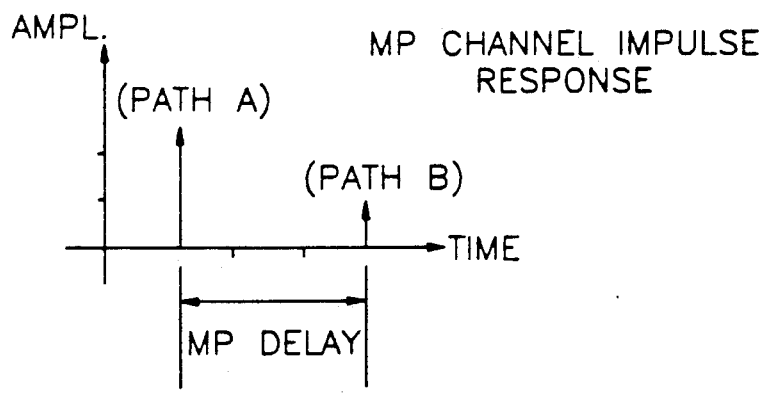
FIG. 5 illustrates the channel impulse response for the example of FIG. 4.

A simplified example of the autocorrelation function for obtaining an estimate of the channel response at the training period $T_1$ of each frame is explained with reference to FIGS. 4-6. For purposes of this example, a four-symbol polyphase code is demonstrated for a channel having a maximum anticipated multipath (MP) delay of three symbol lengths. It is assumed that the channel has a main path A and a delay path B lagging the path A signal by the maximum amount of multipath delay, as shown in FIG. 4, wherein the signal along path A is multiplied by two and that along path B multiplied by one. The channel impulse response of 2, 0, 0, 1 is depicted graphically in FIG. 5. The correlation interval is the interval of training block $T_1$ of the training sequence propagated along path A. That is, it consists of the full sequence of the second training block $T_1$ separated in time by the first training block $T_0$ from multipath interference from the symbols preceding the training sequence. Referring to FIG. 6, the sum of the path A and path B signals received during the correlation interval, as subjected to the channel impulse response, is autocorrelated to the source sequence shifted and rotated one symbol at a time incrementally. Assuming a simple correlation response in which $R(k \times m) = 4$ when the polyphase code elements match each other, and $R(k \cdot m) = 0$ when they do not match, the correlation results of 8, 0, 0, 4 are obtained, which corresponds proportionally to the 2, 0, 0, 1 impulse response of the channel. In practical use, the channel response and the polyphase code elements are complex signals.

Using the above-described autocorrelation function, the channel estimate unit 25 tracks the communication channel response by obtaining an estimate $I_n$, where $n = 0, \ldots, M-1$, corresponding to the number of polyphase code elements $a_n$, for the training block $T_1$ of each frame. Since the number M of training symbols in the training block $T_1$ is the same in each frame, the same channel estimation algorithm is used for the first and all subsequent frames. With this design, each frame alone is sufficient to provide a complete channel response estimation. Thus, if any particular portion of a packet is destroyed by deep fading in the channel, the tracking of the channel is recovered quickly once a good frame is received. In addition, the training blocks are long enough so that there is no inclusion of multipath interference from the unknown data symbols in the channel tracking. Since the correlation calculation requires no recursive iteration, the channel tracking updates for each frame converge immediately on their true values, instead of requiring several updating cycles after several frames as in some less efficient algorithms.

According to a further principle of the invention, an appropriate interpolation formula is selected to provide accurate interpolated estimates of the instantaneous channel response at selected time positions across the data sequence between the estimates for the training periods of adjacent frames. In general, linear interpolation is found to provide satisfactory estimates of the channel response at the intermediate time positions in a frame. However, it is to be understood that other interpolation formulas may also be used. For example, the historical estimates of the channel response at the training periods of each of the frames can be mapped by curve fitting or wave periodicity techniques to project the channel response function broadly over time. This channel response function can then be used as the interpolation function between the training block estimates.

Figure 7:
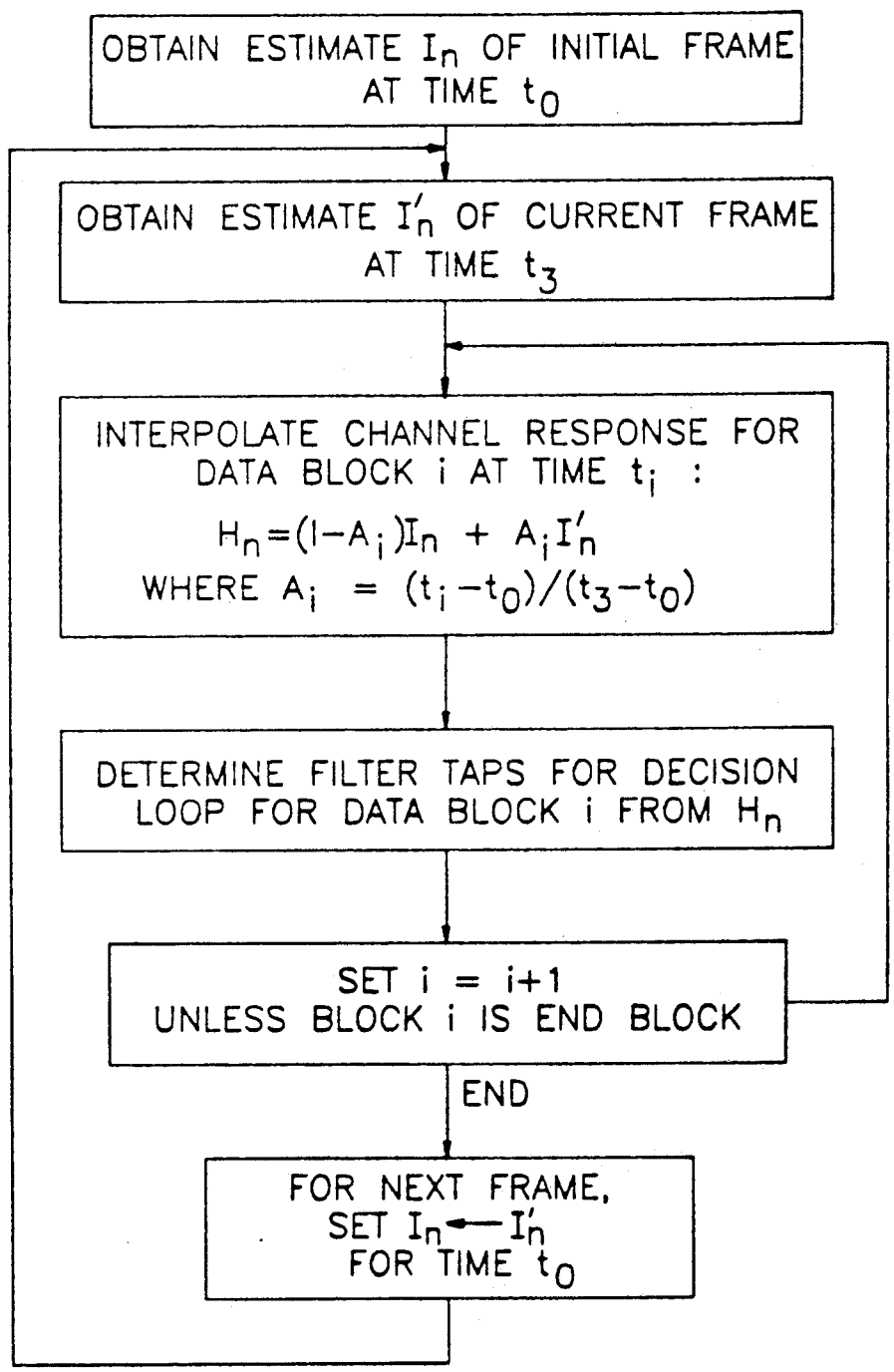
FIG. 7 is a flow chart of the channel tracking algorithm of the invention which provides intermediate channel estimates interpolated between the estimates for adjacent frames.

A preferred algorithm for obtaining interpolated estimates of the channel response, as performed by the interpolation estimate unit 29, is now described with reference to FIG. 7. The estimate $I_n$ for the training period $T_1$ of the initial or previous frame at time $T_0$, and the estimate $I'_n$ for the current frame at time $t_3$ are obtained from the channel estimate unit 25. In this example, the relative time positions $t_0$ and $t_3$ of the training blocks $T_1$ of adjacent frames and $t_1$ and $t_2$ of the data blocks $D_0$ and $D_1$ are taken to be the midpoints of the blocks. Using linear interpolation, the interpolated estimates for the two data blocks are:

$$H_n = (1 - A_1)I_n + A_1 I'_n, \quad n = 0, \ldots, KM - 1$$

$$H'_n = (1 - A_2)I_n + A_2 I'_n, \quad n = 0, \ldots, KM - 1$$

where K is the number of samples per symbol, and $$A_1 = (t_1 - t_0)/(t_3 - t_0),$$

$$A_2 = (t_2 - t_0)/(t_3 - t_0).$$

where $A_1$ and $A_2$ are the relative positions of the data blocks $D_0$ and $D_1$ in the data sequence. An interpolated estimate is derived for each block corresponding to its position in the data sequence of the current frame. For the subsequent frame, $I_n$ is set equal to the current $I'_n$, and the calculation is continued for all frames of the packet.

Figure 8:
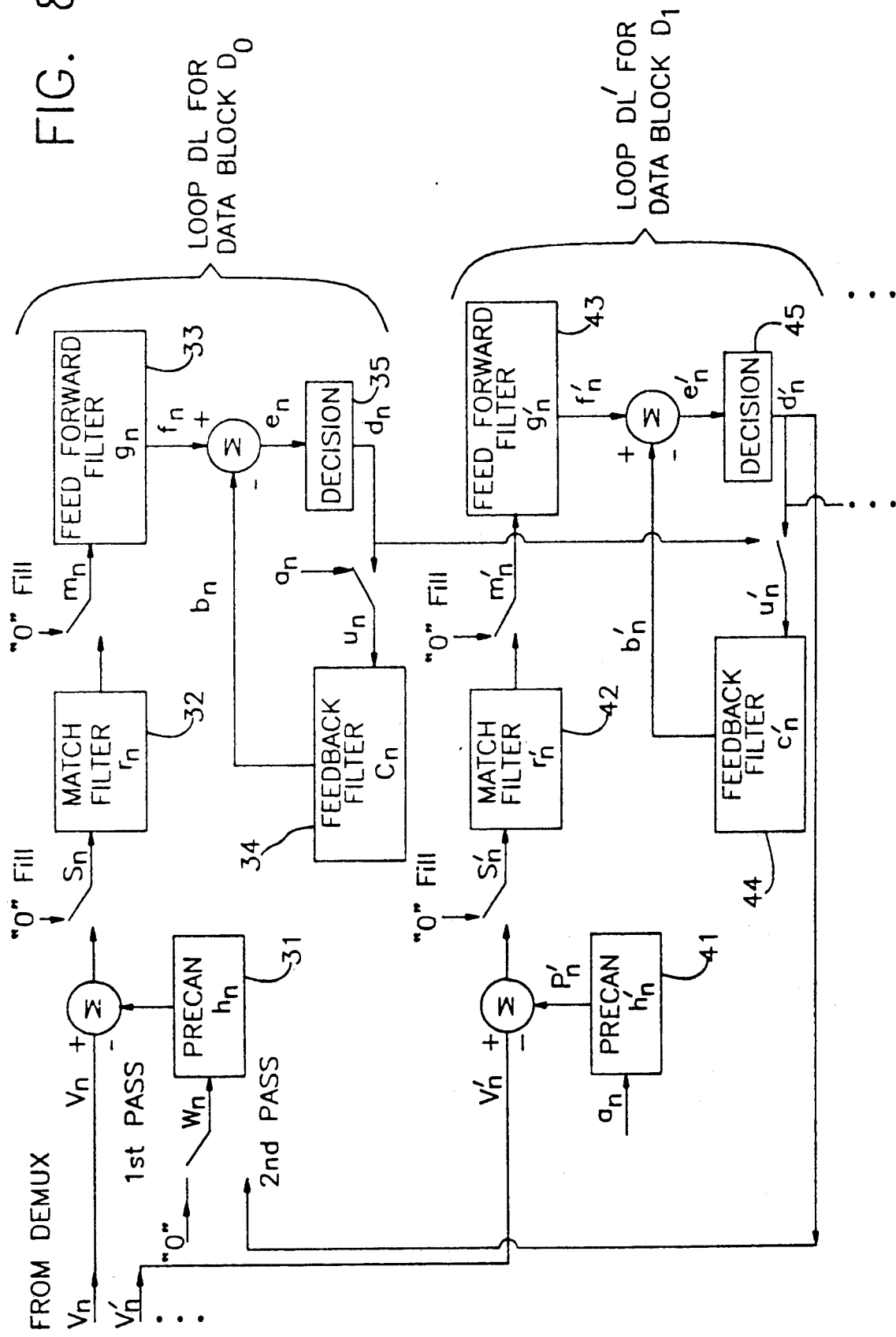
FIG. 8 is a schematic drawing of the processing of unknown data symbols of the data sequence divided into data blocks through respective decision loops.
Figure 9A:
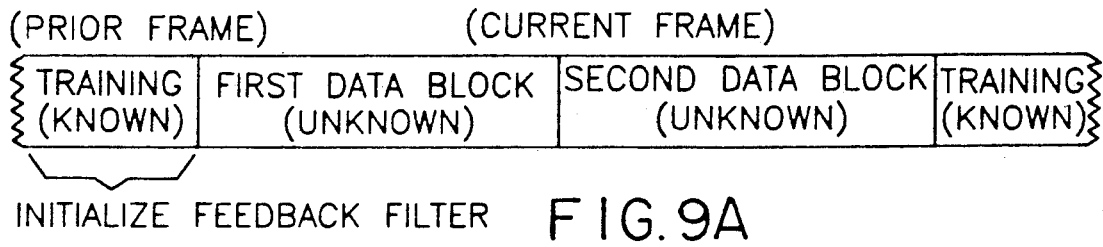
FIG. 9 illustrates the processing steps performed on each data sequence frame-by-frame by the decision loops in FIG. 8.
Figure 9B:
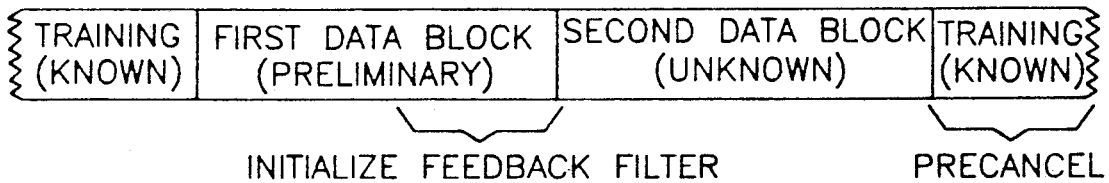
Figure 9C:
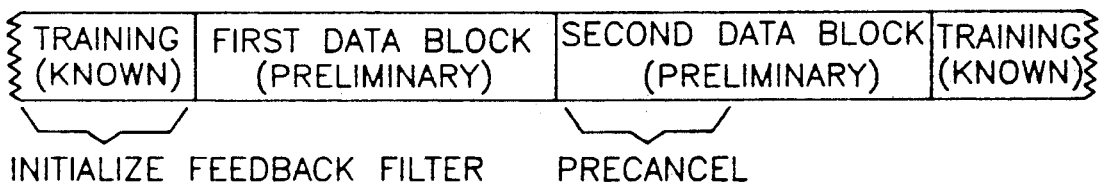
Figure 9D:
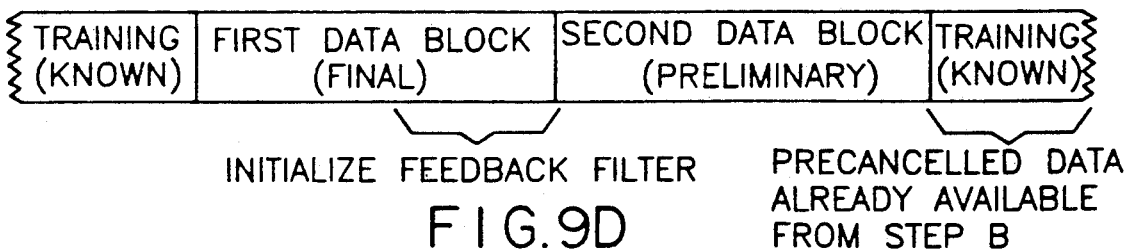

Referring to FIG. 8, the processing of the unknown data is performed on a frame-by-frame basis in the data decision unit 26. The unit employs a number of decision loops corresponding to the number of data blocks into which the data sequence is divided. In this example, a decision loop DL is provided for processing data block $D_0$ and decision loop DL' is provided for data block $D_1$. Each decision loop includes a precanceller 31, 41, for precancelling the effects of ISI interference of the symbols following each data block, a matched filter 32, 42, for matching the overall response of the received signals so that the multipath dispersion echoes are combined into a maximized signal, a feedforward filter (FFF) 33, 43, for removing the ISI of the following symbols, a feedback filter (FBF) 34, 44, for removing the ISI of preceding symbols, and a decision unit 35, 45, for performing a decision function to determine the data symbols of the data block. The precanceller, matched filter and feedback filter each have M filter taps corresponding to the number of polyphase code elements used to measure the channel response. The feedforward filter has N taps corresponding to the number of unknown symbols in each data block. Each data block of a frame is processed in two passes through the corresponding decision loop so that the decisions for the symbols of a following data block decided in the first pass can be used in the precanceller of the preceding data block in the second pass. Use of the preliminary decisions in the second pass improves the final bit-error rate. More than two passes may be used to obtain further improvements in the bit-error rate if desired, although two passes is usually found to be sufficient.

The interpolated estimates of the channel response corresponding to the positions of the respective data blocks being processed are used to determine the filter taps of the precancellers, matched filters, feedforward filters, and feedback filters for the corresponding decision loops. As an alternative to first interpolating the channel impulse response and then solving for the filter taps $g_n$ it is also possible to first solve for the filter taps using the channel impulse responses $I_n$ and $I'_n$ obtained for the training period and then perform interpolations on the filter taps to obtain $g_n$ and $g'_n$. An advantage of this alternative $g_n$ solution is that the number of times the matrix inversion has to be done is reduced, thus decreasing the processing time. The filters used in the preferred modem system are of the transversal type having taps as weighted coefficients. The number of taps corresponds to the number M of elements used to measure the channel response. The precanceller filter taps $h_n$, $h'_n$ are set to be the same as the channel response estimate obtained from the interpolation estimate unit 29 (see FIGS. 3 and 7):

$$h_n = H_n.$$

$$h'_n = H'_n.$$

The matched filter taps are obtained from the channel response estimate by reversing the order of elements in time and taking the conjugate:

$$r_{-n} = H_n^*.$$

$$r'_{-n} = H'_n^*.$$

The filter taps for the feedforward filters and feedback filters are calculated based upon the methodology described in the above-mentioned paper by Mueller and Salz. Theoretically, these taps depend on the ideal channel response and the noise density. In practice, the ideal channel response is not known because some residual noise is always present in the estimated channel response obtained by the tracking algorithm. Thus, the autocorrelation of the estimated channel response will automatically include the effect of the noise density. From this autocorrelation, the FFF taps $g_n$, $g'_n$ are determined by solving the set of N linear equations, namely:

$$\sum_{n=-N-1}^{0} g_i R_{k-n} = 1, k = 0.$$

$$= 0, k = -(N-1), \ldots, -1.$$

The autocorrelation function $R_n$ is computed by using the interpolated channel response such that:

$$R_n = \sum_{k=0}^{KM-1} H_k H_{k-Kn}, n = 0, \ldots, M-1.$$

$$= 0, n = M, \ldots, N-1, \text{ assuming } N > M.$$

$$R_{-n} = R^*_n, n = 0, \ldots, N-1.$$

The equations for $g_n$ are in Hermetian Toeplitz form such that they can be efficiently solved using Trench's algorithm, as explained in "Weighting Coefficients for the Prediction of Stationary Time Series From the Finite Past", SIAM J. Appl. Math. 15, pp. 1502–1510 (1967). From the FFF taps $g_n$, which are zero filled for following symbols, the FBF taps $c_n$ are obtained as:

$$c_n = \sum_{k=0}^{N-1} R_k g_{n-k}, n = 1, \ldots, M-1.$$

The taps $g'_n$ and $c'_n$ are similarly obtained.

In FIG. 8, the precancellers 31, 41, for the decision loops Dl and DL' remove the ISI interference of the known symbols following each data block by subtracting the precanceller outputs $p_n$, $p'_n$ from the signal samples $v_n$, $v'_n$ for the data symbols of the respective data blocks provided from the demultiplexer 23, prior to passing the resulting signals $s_n$, $s'_n$ through the matched filter 32, 42. The symbols $w_n$ following the $D_0$ data block are the symbols $d'_n$ of the $D_1$ data block decided in the DL' loop after the first pass, and are thus used in the DL precanceller 31 on the second pass. For the first pass, $w_n$ is set to zero. The symbols $w'_n$ following the $D_1$ data block are known because they are simply the training symbols $a_n$ of the training block $T_0$. The precanceller outputs $p_n$, $p'_n$ are computed by convolving the precanceller filter taps with the input $w_n$ of the known symbols, i.e.:

$$p_n = 0, \text{ first pass.}$$
$$= E d'_n h_n, \text{ second pass.}$$
$$p'_n = E a_n h'_n, \text{ first and second passes.}$$

where "E" represents summation across the M precanceller filter taps. The values of $p_n$ and $p'_n$ represent an estimate of what the effect on the received samples would be if the known symbols were transmitted alone. By subtracting these estimated effects from the actual received samples, the interference of the future known symbols on the unknown data symbols is removed, i.e.:

$$s_n = v_n, \text{ first pass}$$
$$= v_n - p_n, \text{ second pass}$$
$$s'_n = v'_n - p'_n, \text{ first and second passes.}$$

The interference removal could be postponed later to the feedback filter function 34, 44. However, this would present an inconvenience as far as keeping the processing on a frame-by-frame basis. Thus, it is more advantageous to precancel instead of including the removal of future, known symbol interference from the following block in the feedback filter, which is already responsible for removal of past, adjacent symbol interference. The amplitude level of the outputs after precancellation is automatically adjusted by the precanceller filter taps so that after subtraction, only the contribution from the delayed unknown data symbols would remain if the cancellation was exact.

The matched filters 32, 42 receive the respective outputs $s_n$, $s'_n$ after precancellation. The matched filter maximizes the signal-to-noise ratio (SNR) of the unknown data symbols to be determined. It effectively combines the echoes of the transmitted signals from the individual dispersion paths into a combined, reinforced signal. However, it increases the ISI caused by the adjacent symbols. The matched filter is thus followed by the feedforward filter 33, 43 and feedback filter 34, 44 which subtract out the adjacent symbol ISI, thereby leaving a net gain in SNR to enhance the symbol decision operation of the decision unit 35, 45. A zero fill is used for the input to the matched filter to make up enough samples for the matched filter function, while preserving the received samples in their proper position in time. The zero fill is a convenient way of preventing the future symbols more than the maximum multipath delay away from affecting the data block being processed.

When there are multiple received samples per symbol, the matched filters also perform a down sampling operation so that thereafter there is only one sample per symbol to be processed in each decision loop. The outputs of the matched filters are given by:

$$m_n = \Sigma\, s_n r_n.$$

$$m'_n = \Sigma\, s'_n r'_n.$$

where $r_n$ and $r'_n$ are the respective filter taps of the matched filters. Thus, the samples output from the matched filters represents the data symbols with noise corruption reduced by the matched filter function, but with a significant amount of ISI corruption from adjacent symbols.

The feedforward filters (FFF) 33, 43 operate on each present symbol and its future adjacent symbols by sequential processing in shift register fashion. A present symbol is operated on so that its amplitude is adjusted to the expected level for the later feedback filter cancellation and the symbol decision functions. The amplitude adjusting function can also be handled by the matched filter. The future adjacent symbols are operated on by the FFF in a linear equalizer fashion such that the total system response would ideally be reduced to an impulse function, thus reducing the ISI. The outputs of the FFF are given by:

$$f_n = \Sigma\, m_n g_n.$$

$$f'_n = \Sigma\, m'_n g'_n.$$

where $g_n$ and $g'_n$ are the respective filter taps of the feedforward filters.

The FFF has no knowledge of the data symbols in the first pass so that a linear equalizer approach is appropriate. The equalizer function is a compromise between reducing the ISI and accepting a penalty in poorer SNR. In the second pass the data symbols have been decided upon once so that they are not totally unknown. Thus, it may be possible to avoid using the FFF and the associated SNR penalty by modifying the feedback filter function to make use of all adjacent symbols as they become known. This would change the present frame-by-frame processing structure of the decision loops and require a different programming and certain improvements in performance can be anticipated.

The feedback filters (FBF) 34, 44 remove the ISI due to adjacent preceding symbols, but unlike the FFF it does not compromise the SNR since removal is accomplished by cancellation rather than by equalization. The FBF operate by sequential processing in shift register fashion. In the decision loop DL, the symbols $u_n$ preceding the symbols of the first data block $D_0$ are a combination of the training symbols $a_n$ of the preceding training block $T_1$ and the decisions $d_n$ from the decision unit 35 as they are decided in the first pass. In the decision loop DL', the preceding symbols $u'_k$ for the second data block $D_1$ are a combination of the decisions $d_n$ from the decision unit 35, and the decisions $d'_n$ from the decision unit 45 as they are decided. Based upon the estimates of the channel response and the previous symbols, the ISI is computed by the FBF as follows:

$$b_n = \Sigma\, u_n c_n.$$

$$b'_n = \Sigma\, u'_n c'_n.$$

where $c_n$ and $c'_n$ are the respective filter taps of the feedforward filters. The outputs $b_n$, $b'_n$ of the FBF are subtracted in sequence from the outputs $f_n$, $f'_n$ of the FFF to provide the inputs $e_n$, $e'_n$ to the decision units 35, 45, respectively, as follows:

$$e_n = f_n - b_n.$$

$$e'_n = f'_n - b'_n.$$

A diagram of the processing sequence for the data blocks in each frame is shown in FIG. 9 corresponding to the data recovery algorithm shown in FIG. 8. On the first pass, the training symbols of block $T_0$ of the prior frame initialize the feedback filter of the decision loop DL for the first data block of the current frame. The training block $T_0$ is used for the precanceller 41 of the decision loop DL' for the second data block, and the preliminary decisions on the first data block initialize the feedback filter as they are decided. On the second pass, the preliminary decisions on the second data block are used in the precanceller 31 of the decision loop DL for the first data block, and the final decisions on the first data block initialize the feedback filter for the decision loop DL' as they are decided. The outputs from the decision units 35, 45 after the second pass are taken as the final decisions on the data symbols received. A summary of the notations used in the above description, together with a more detailed representation of the series elements thereof, is provided on Table A appended hereto.

Figure 10:
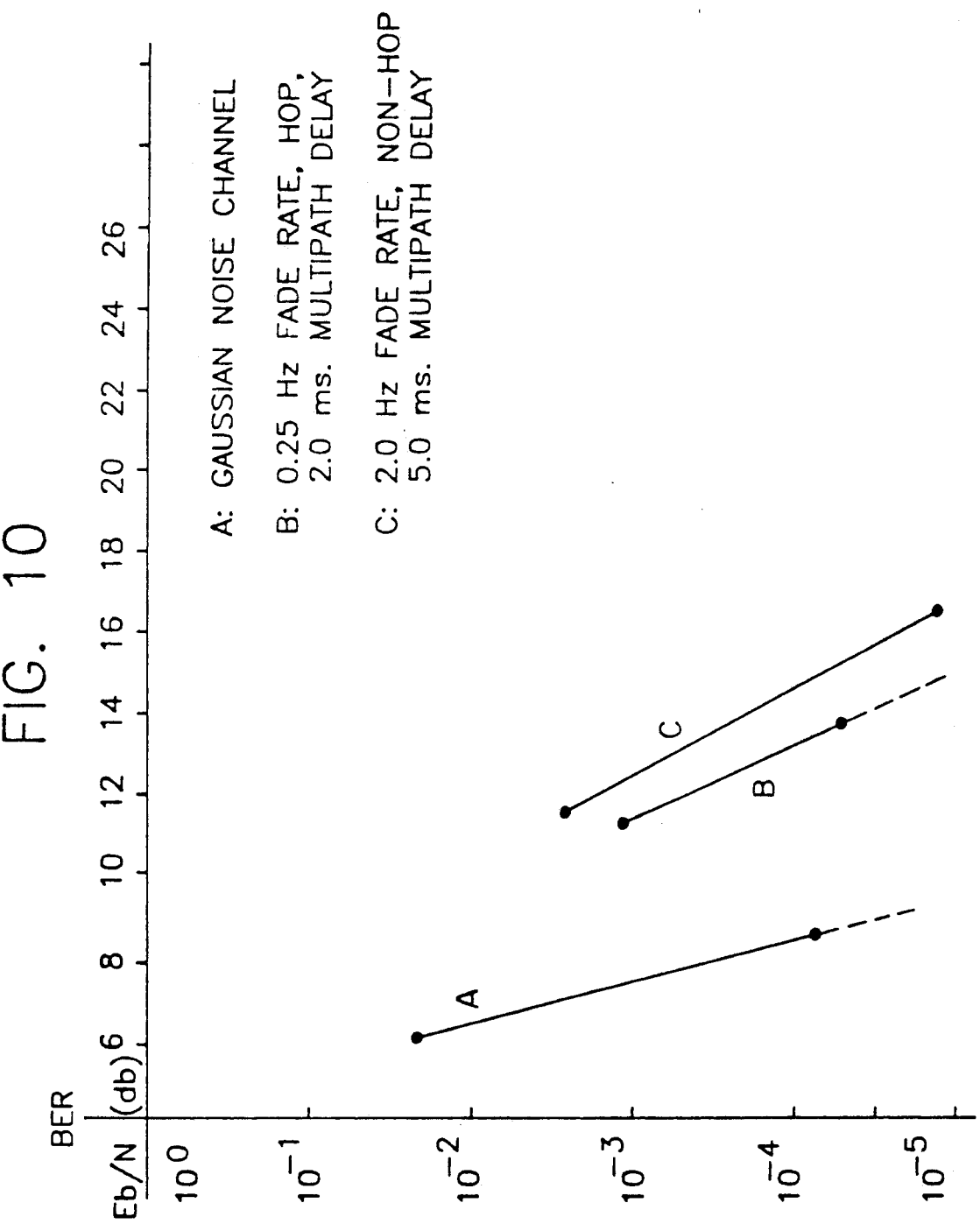
FIG. 10 is a chart showing the performance of the modem system of the invention obtaining very low bit-error rates relative to the energy/bit to noise ratio for different types of communication channels.

The above-described modem system, packet format, channel tracking, interpolation and data recovery algorithms of the invention are found to provide an excellent bit-error rate (BER) performance in relation to the energy/bit to noise (Eb/N) ratio. In FIG. 10, the BER results are shown for the system of the present invention configured for 4800 bps. The "A" curve represents the results for a Gaussian noise channel. The results for a slow fading channel, at 0.25 Hz rate, is shown in curve "B". The results for a fast fading channel, at 2.0 Hz rate, is shown in curve "C". The latter represents a dramatic improvement over conventional modem systems. The system of the invention also has excellent properties for frequency hopping and data recovery. No prior history is needed before the first frame of training blocks is received at the start of the packet. Unlike other channel estimation algorithms which require extensive iterative computation and updating over several frames or longer to converge on true values, the channel estimates obtained in the invention are derived by relatively simple computation and are accurately obtained within each frame. Moreover, if a portion of the packet is lost due to channel fading or interference, the remaining frames are unaffected and can be demodulated and decoded with no adverse impact. Furthermore, intermediate channel estimates are readily obtained by interpolation for any number of data blocks into which the data sequence of a frame is divided, and can even be obtained for individual symbols. Thus, the tap values of the filter functions of each decision loop directly correspond to the channel response at the time position of the data block in the data sequence.

The specific embodiments of the invention described above are intended to be illustrative only, and many other variations and modifications may be made thereto in accordance with the principles of the invention. All such embodiments and variations and modifications thereof are considered to be within the scope of the invention, as defined in the following claims.

TABLE A

| | |
|---|---|
| $a_n$ | known training symbols, $n = 0, \ldots, M - 1$ |
| $b_n, b'_n$ | feed back filter output symbols, $n = 0, \ldots, N - 1$ |
| $c_n, c'_n$ | feedback filter taps, $n = 1, \ldots, M - 1$ |
| $d_n, d'_n$ | decision output symbols, $n = 0, \ldots, N - 1$ |
| $e_n, e'_n$ | feedback equalizer output symbols, $n = 0, \ldots, N - 1$ |
| $f_n, f'_n$ | feedforward filter output symbols, $n = 0, \ldots, N - 1$ |
| $g_n, g'_n$ | feedforward filter taps, $n = -(N - 1), \ldots, 0$ |
| $h_n, h'_n$ | precanceller filter taps, $n = 0, \ldots, KM - 1$ |
| $H_n, H'_n$ | interpolated channel estimates, $n = 0, \ldots, KM - 1$ |
| $I_n, I'_n$ | training period channel estimates, $n = 0, \ldots, KM - 1$ |
| $K$ | number of samples per symbol |
| $m_n, m'_n$ | matched filter output symbols, $n = 0, \ldots, 2N - 1$, if $N > M$ |
| $M$ | number of known symbols in each training block |
| $N$ | number of unknown symbols in each data block |
| $p_n, p'_n$ | precanceller output samples, $n = KN, \ldots, K(M + N) - 1$ |
| $r_n, r'_n$ | matched filter taps, $n = -(KM - 1), \ldots, 0$ |
| $s_n, s'_n$ | input samples to matched filter, $n = 0, \ldots, K(2M + N) - 1$ |
| $u_n, u'_n$ | input symbols to feedback filter, $n = -(M - 1), \ldots, N - 2$ |
| $v_n, v'_n$ | input samples from demux, $n = 0, \ldots, K(M + N) - 1$ |
| $w_n$ | first precanceller input symbols, $n = 0, \ldots, M - 1$ |
| $x_n$ | received samples in each frame, $n = 0, \ldots, 2K(M + N) - 1$ |
| $y_n$ | received samples in initial frame, $n = 0, \ldots, 2KM - 1$ |

We claim

1. An adaptive modem system for a communication channel exhibiting multipath dispersion, which has a channel response characterized by an anticipated multipath delay time length, comprising:

transmitting means for transmitting signals over the communication channel representing a packet of data made up of a plurality of frames in series, wherein each frame is composed of two adjacent training blocks in series with a data sequence of unknown symbols, which symbols are unknown as containing data to be received and which symbols become known only when received and decoded with respect to an accurate estimate of said channel response and wherein a second of the two training blocks is made up of M known symbols, and a first of the two training blocks has a time length longer than the multipath delay time length and separates the second training block from the data sequence; and receiving means for receiving the transmitted signals, demodulating the data packet therefrom, and processing each frame thereof, including:

(a) source means for storing and generating the sequence of M known symbols;

(b) channel estimate means for correlating the sequence of M known symbols from said source means with the received M known symbols of the second training block and obtaining an estimate of said channel response as would be associated with an anticipated multipath delay time length in each frame of the data packet, wherein said second training block is isolated by the time length of said first training block so as to be substantially unaffected by any multipath dispersion from the data sequence; and (c) decision means for decoding the unknown symbols of the data sequence in each frame using the estimate of said channel response as obtained.

2. An adaptive modem system according to claim 1 wherein said two training blocks each have the same time length longer than the multipath delay and have the same M symbols.

3. An adaptive modem system according to claim 1, wherein each packet transmitted by said transmitted means has an initial frame containing the two training blocks and a series of subsequent frames each having the two adjacent training blocks following a data sequence of unknown symbols.

4. An adaptive modem system according to claim 1, wherein said receiving means further includes interpolating means for interpolating an estimate of the channel response at a time position corresponding to any selected part of the data sequence based upon the estimates obtained for the second training block for the current frame and an adjacent frame, and wherein said decision means uses said interpolated estimate for deciding the unknown symbols in at least said selected part of the data sequence.

5. An adaptive modem system according to claim 1, wherein said receiving means further includes demultiplexing means for dividing the data sequence into a series of i data blocks of N symbols each, interpolating means for interpolating an estimate of the channel response for each respective data block at its corresponding time position $t_i$ in the data sequence, and wherein said decision means includes a plurality of i decision loops each having selected filtering functions for processing a respective one of said data blocks, respectively, said filtering functions of each decision loop having tap values which are set in accordance with the interpolated channel response estimate for the corresponding data block.

6. An adaptive modem system according to claim 5 adapted to track the communication channel varying at a rate of 2 Hz or more.

7. An adaptive modem system according to claim 5 configured so as to decode data symbols at a bit-error rate of from 0.001 to 0.00001 for an energy/bit to noise ratio of from about 12 to 16 db for HF transmission at a rate of 4800 bps with 1 Hz fading, 5 msec multipath dispersion.

8. An adaptive modem system for receiving signals transmitted over a communication channel in a packet made up of a plurality of frames in series, wherein each frame includes a training sequence of M known symbols in series with a data sequence of unknown symbols which symbols are unknown as containing data to be received and which symbols become known only when received and decoded with respect to an accurate estimate of said channel response, said channel having a channel response characterized by an anticipated multipath delay time length, comprising:

receiving means for receiving the transmitted signals, demodulating the data packet therefrom, and processing each frame thereof, including:

(a) source means for storing and generating the sequence of M known symbols;

(b) channel estimate means for correlating the sequence of M known symbols from said source means to the received M known symbols of the training sequence in each frame of the data packet, in order to derive an estimate of the channel response for a corresponding time position of the training sequence in each frame with said estimated channel response being that which would be associated with an anticipated multipath time delay; and (c) decision means for decoding the unknown symbols of the data sequence in each frame, said decision means including the interpolating means for interpolating an estimate of the channel response at a time position corresponding to a selected part of the data sequence based upon the estimates obtained for the training sequence for said frame and an adjacent frame, and wherein said decision means uses said interpolated estimate for deciding the unknown symbols in at least said selected part of the data sequence.

9. An adaptive modem system according to claim 8, wherein said receiving means further includes demultiplexing means for dividing the data sequence into a series of i data blocks of N symbols each, interpolating means for interpolating an estimate of the channel response for each respective data block at its corresponding time position $t_i$ in the data sequence, and wherein said decision means includes a plurality of i decision loops each having selected filtering functions for processing a respective one of said data blocks, respectively, said filtering functions of each decision loop having tap values which are set in accordance with the interpolated channel response estimate for the corresponding data block.

10. An adaptive modem system according to claim 9, wherein said training sequence consists of two training blocks each having the same time length longer than the multipath delay and having the same M symbols, and said two training blocks follow a data sequence in each frame divided into at least two data blocks to be processed in at least two decision loops of said decision means frame-by-frame.

11. An adaptive modem system according to claim 10, wherein each data block is processed through its corresponding decision loop in at least two passes, and each decision loop includes a precanceller for precancelling interference from a following data block, a matched filter for combining input signals for the symbols in each frame from said precanceller into enhanced signals, a feedforward filter and a feedback filter for removing intersymbol interference of adjacent symbols in the enhanced signals from said matched filter, and a decision unit for deciding the data symbols filtered by said feedforward and feedback filters.

12. An adaptive modem system according to claim 11,
wherein on the first pass, a preceding training block of a prior adjacent frame is used to initialize the feedback filter of a first decision loop for a first data block of the current frame, a following training block in the current frame is used for the precanceller of a second decision loop for a following, second data block, and decisions made by the decision unit on the first data block are used to initialize the feedback filter of the second decision loop, and
wherein on the second pass, decisions made on the second data block on the first pass are used in the precanceller of the first decision loop, and decisions on the first data block on the second pass are used to initialize the feedback filter for the second decision loop.

13. A method of operating an adaptive modem system for receiving signals transmitted over a communication channel in a packet made up of a plurality of frames in series, wherein each frame includes a training sequence of M known symbols in series with a data sequence of unknown symbols which symbols are unknown as containing data to be received and which symbols become known only when received and decoded with respect to an accurate estimate of said channel response, said channel having a channel response characterized by an anticipated multipath delay time length, comprising the steps of:

receiving the transmitted signals, demodulating the data packet therefrom, and processing each frame thereof, including:
(a) storing and generating the sequence of M known symbols;
(b) correlating the sequence of M known symbols to the received M known symbols of the training sequence in each frame of the data packet, in order to derive an estimate of the channel response for a time position of the training sequence in each frame with said estimated channel response being that which would be associated with an anticipated multipath time delay, and
(c) interpolating an interpolated estimate of the channel response at a time position corresponding to a selected part of the data sequence intermediate to the time positions of the training sequences for a frame and an adjacent frame based upon the estimates obtained for the training sequences, and using said interpolated estimate for deciding the unknown symbols in at least said selected part of the data sequence.

14. A method of operating an adaptive modem system according to claim 13, further comprising the steps of dividing the data sequence into a series of i data blocks of N symbols each, interpolating an estimate of the channel response for each respective data block at its corresponding time position $t_i$ in the data sequence, and using the interpolated estimates for processing the respective data blocks through a plurality of i decision loops corresponding to said data blocks, respectively, wherein each of the decision loops have selected filtering functions in which respective tap values are set in accordance with the interpolated channel response estimate for the corresponding data block.

15. A method of operating an adaptive modem system for a communication channel exhibiting multipath dispersion, which has a channel response characterized by an anticipated multipath delay time length, comprising the step of:

transmitting signals over the communication channel representing a packet of data made up of a plurality of frames in series, wherein each frame is composed of two adjacent training blocks in series with a data sequence of unknown symbols which symbols are unknown as containing data to be received and which symbols become known only when received and decoded with respect to an accurate estimate of said channel response, and wherein a second of the two training blocks is made up of M known symbols, and a first of the two training blocks has a time length longer than the multipath delay time length and separates the second training block from the data sequence such that an estimate of the channel response for each frame can be obtained by correlating the received signals for the second training block of each frame with a stored version of the M known symbols without interference from the unknown symbols of the data sequence.

16. A method of operating an adaptive modem system according to claim 15, wherein said two training blocks each have the same time length longer than the multipath delay and have the same M symbols.

17. A method of operating an adaptive modem system according to claim 16, wherein said time length of each of said training blocks is longer than about 5 milliseconds for the anticipated multipath delay.

18. A method of operating an adaptive modem system according to claim 15, wherein each packet transmitted by said transmitted means has an initial frame containing the two training blocks and a series of subsequent frames each having the two adjacent training blocks following a data sequence of unknown symbols.

19. A method of operating an adaptive modem system for receiving signals transmitted over a communication channel in a packet made up of a plurality of frames in series, wherein each frame includes a training sequence of M known symbols in series with a data sequence of unknown symbols which symbols are unknown as containing data to be received and which symbols become known only when received and decoded with respect to an accurate estimate of said channel response, said channel having a channel response characterized by an anticipated multipath delay time length, comprising the steps of:

receiving the transmitted signals, demodulating the data packet therefrom, and processing each frame thereof, including:

dividing the data sequence of each frame into a series of at least two data blocks of N symbols each;

processing each of said at least two data blocks through a corresponding one of at least two decision loops in at least two passes, wherein each decision loop includes a matched filter for combining input signals for the symbols in each frame into enhanced signals, a feedforward filter and a feedback filter for removing intersymbol interference of adjacent symbols in the enhanced signals from said matched filter, and a decision unit for deciding the data symbols filtered by said feedforward and feedback filters, wherein on the first pass, a preceding training sequence of a prior adjacent frame is used to initialize the feedback filter of a first decision loop for a first data block of the current frame, and decisions made by the decision unit on the first data block are used to initialize the feedback filter of a second decision loop for a following, second data block, and wherein on the second pass, decisions on the first data block on the second pass are used to initialize the feedback filter for the second decision loop.

20. A method of operating an adaptive modem system according to claim 19, wherein each decision loop for the corresponding data block further includes a precanceller for precancelling interference from a following data block from the signals provided to said matched filter, and wherein decisions made on the second data block on the first pass are used in the precanceller of the first decision loop, and a following training sequence in the current frame is used for the precanceller of the second decision loop.

21. A method of operating an adaptive modem system according to claim 19, further comprising the steps of:

(a) storing and generating the sequence of M known symbols;

(b) correlating the sequence of M known symbols to the received M known symbols of the training sequence in each frame of the data packet, in order to derive an estimate of the channel response for a time position of the training sequence in each frame with said estimate of the channel response being that which would be associated with an anticipated multipath time delay; and (c) interpolating an interpolated estimate of the channel response at a time position corresponding to each data block of the data sequence intermediate the time positions of the training sequences for a frame and an adjacent frame based upon the estimates obtained for the training sequences, and using said interpolated estimate for each data block to set respective tap values of the filtering functions in each corresponding decision loop.

22. A method of operating an adaptive modem system according to claim 19, wherein said training sequence consists of two training blocks each having the same time length longer than the multipath delay and having the same M symbols.

* * * * *